(12) United States Patent
Li et al.

(10) Patent No.: US 9,184,801 B2
(45) Date of Patent: Nov. 10, 2015

(54) APPARATUS AND METHODS FOR NEAR-FIELD COMMUNICATION BASED DEVICE CONFIGURATION AND MANAGEMENT

(71) Applicant: Apple Inc., Cupertino, CA (US)

(72) Inventors: Li Li, Los Altos, CA (US); Ben-Heng Juang, Milpitas, CA (US); Arun G. Mathias, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 109 days.

(21) Appl. No.: 13/941,230

(22) Filed: Jul. 12, 2013

(65) Prior Publication Data

US 2015/0017910 A1     Jan. 15, 2015

(51) Int. Cl.
 *H04B 5/00* (2006.01)
(52) U.S. Cl.
 CPC .................................. *H04B 5/0031* (2013.01)

(58) Field of Classification Search
 CPC ...... H04B 5/0031; H04B 5/0037; H02J 5/005
 USPC ......... 455/41.1, 41.2, 573, 130, 343.1, 343.5, 455/514, 572; 340/854.6, 854.8, 855.8, 340/10.33, 10.34; 307/104; 320/108
 See application file for complete search history.

(56) References Cited

U.S. PATENT DOCUMENTS

2014/0045423 A1*  2/2014  Haid et al. ................... 455/41.1
2014/0274032 A1*  9/2014  Shipley et al. ............. 455/426.1

* cited by examiner

*Primary Examiner* — Tuan Pham
(74) *Attorney, Agent, or Firm* — Downey Brand LLP

(57) ABSTRACT

Methods and apparatus for activating a mobile device for use with a service provider. In one embodiment, a powered-off mobile device having an inserted Subscriber Identity Module (SIM) may be programmed with configuration data while "in box" (e.g., at a point of sale (POS), in a warehouse, etc.) using a near field communication (NFC) data interface. In another exemplary embodiment, information that is stored to a NFC accessible memory can be accessed when the device is non-functional e.g., to retrieve backup data.

20 Claims, 5 Drawing Sheets

APPARATUS AND METHODS FOR NEAR-FIELD COMMUNICATION BASED DEVICE CONFIGURATION AND MANAGEMENT

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The present disclosure relates generally to the field of inventory management, and more particularly in one exemplary embodiment to near-field based mechanisms for configuration and/or management of an unpowered device.

2. Description of Related Technology

Near field communication (NFC) is a wireless technology which allows devices to wirelessly communicate with one another over very close proximities. Typical distances are no more than a few centimeters (and/or physical contact). Current and incipient technologies for NFC communication include e.g., contactless transactions, data exchange, etc.

One unusual feature of NFC communication (and its related technology Radio Frequency ID (RFID)) is so-called passive communication capabilities. With passive communication, an active "interrogator" device (also referred to as the "reader") transmits a signal that is inductively "harvested" to power the passive interrogated device (also referred to as the "client" or "tag"). The transmitted signal also includes a constant wave (CW) portion. The tag can respond to the interrogator by reflecting back a modulated version of the CW portion of the transmitted signal. Traditionally, passive communication has enabled communication with otherwise unpowered tag devices such as for e.g., inventory management, etc.

Incipient research is directed to incorporating NFC capabilities within mobile devices. However, existing applications are primarily directed to augmentation of existing powered mobile device applications with the "touch" capabilities of NFC; e.g., mobile payments, etc. However, the use of passive communications technology for unpowered mobile device applications (e.g., when the components of a mobile device do not have power) remain an area of substantial interest.

One area which could benefit from passive communications technology is inventory management of mobile devices. For reasons described in greater detail hereinafter, the distribution, sale, and delivery of mobile devices from the manufacturer to the customer can be a convoluted process which has unique inventory issues and/or business model considerations. Accordingly, new solutions for inventory management that leverage near-field based technologies are desired.

SUMMARY

The present disclosure addresses the foregoing needs by providing, inter alia, apparatus and methods for configuration and/or management of an unpowered device.

Firstly, a wireless device is disclosed. In one embodiment, the wireless device includes: an indigenous power supply; a near-field communication interface configured to harvest energy radiated from an external interrogator device, and to receive configuration data without receiving power from the indigenous power supply; a memory structure configured to store the received configuration data; a processor; and a non-transitory computer readable medium. In one implementation, the non-transitory computer readable medium includes one or more instructions configured to, when executed by the processor, cause the wireless device retrieve the received configuration data from the memory structure, and configure the wireless device based on the received configuration data.

In one variant, the memory structure includes a subscriber identity module (SIM) card. Alternatively, the memory structure includes a non-removable secure element of the wireless device.

In another variant, the received configuration data includes one or more network specific parameters useful for authentication and identification.

In some cases, the one or more instructions are configured to be executed when the wireless device is powered on. For example, in one such case, the configuration of the wireless device comprises a one-time startup configuration program.

In another variant, the configuration data is based on one or more customer defined parameters. In one exemplary use case, the one or more customer defined parameters are determined when a customer orders the wireless device.

In another embodiment, the wireless device includes: an indigenous power supply; a near-field communication interface configured to utilize energy radiated from an external interrogator device, and to transmit one or more backup data without receiving power from the indigenous power supply; a memory structure configured to store the one or more backup data; a processor; and a non-transitory computer readable medium. In one implementation, the non-transitory computer readable medium includes one or more instructions configured to, when executed by the processor, cause the device to update the one or more backup data stored within the memory structure.

In one variant, the one or more backup data comprises one or more of: user data, phone book contact data, device specific data, and network configuration data. In some cases, the one or more backup data are further encrypted.

In another variant, the memory structure comprises a removable or non-removable secure element.

A method of configuring an unpowered mobile device is also disclosed. In one embodiment, the method includes: harvesting energy via a near-field communication interface; receiving one or more configuration data via the near-field communication interface and storing the received one or more configuration data to a passive memory structure; and responsive to being powered up, retrieving the received one or more configuration data from the passive memory structure in order to configure the mobile device based on the received configuration data.

In one variant, the receiving of the one or more configuration data is performed prior to shipping the unpowered mobile device to a customer.

In another variant, the configuration data comprises one or more network specific parameters. In another case, the configuration data comprises one or more user specific parameters provided during a customer ordering process.

In some cases, the receiving one or more configuration data is performed at a point of sale (POS) or distribution warehouse. For example, the configuration data may include one or more user specific or device specific parameters determined by the POS.

A method of retrieving backup data from a non-operative mobile device is further disclosed. In one embodiment, the method includes: receiving energy via a near-field communication interface; and responsive to a request for backup data, transmitting one or more backup data via the near-field communication interface. In one variant, the one or more backup data comprises data previously stored by a processor of the mobile device during normal operation.

An interrogator device is also disclosed. In one embodiment, the interrogator device includes: a near-field communication interface configured to radiate energy to a client device, the radiated energy sufficient to power a passive interface of the client device; a processor; and a non-transitory computer readable medium. In one exemplary variant, the one or more instructions are configured to, when executed by the processor, cause the interrogator device to: transact one or more configuration data with the passive interface of the client device, and program one or more configuration data to a passive memory structure of the client device The client device is configured to configure itself for network operation based on the programmed configuration data.

Further features of the various principles described herein, their nature and various advantages will be more apparent from the accompanying drawings and the following detailed description.

Figure 1:
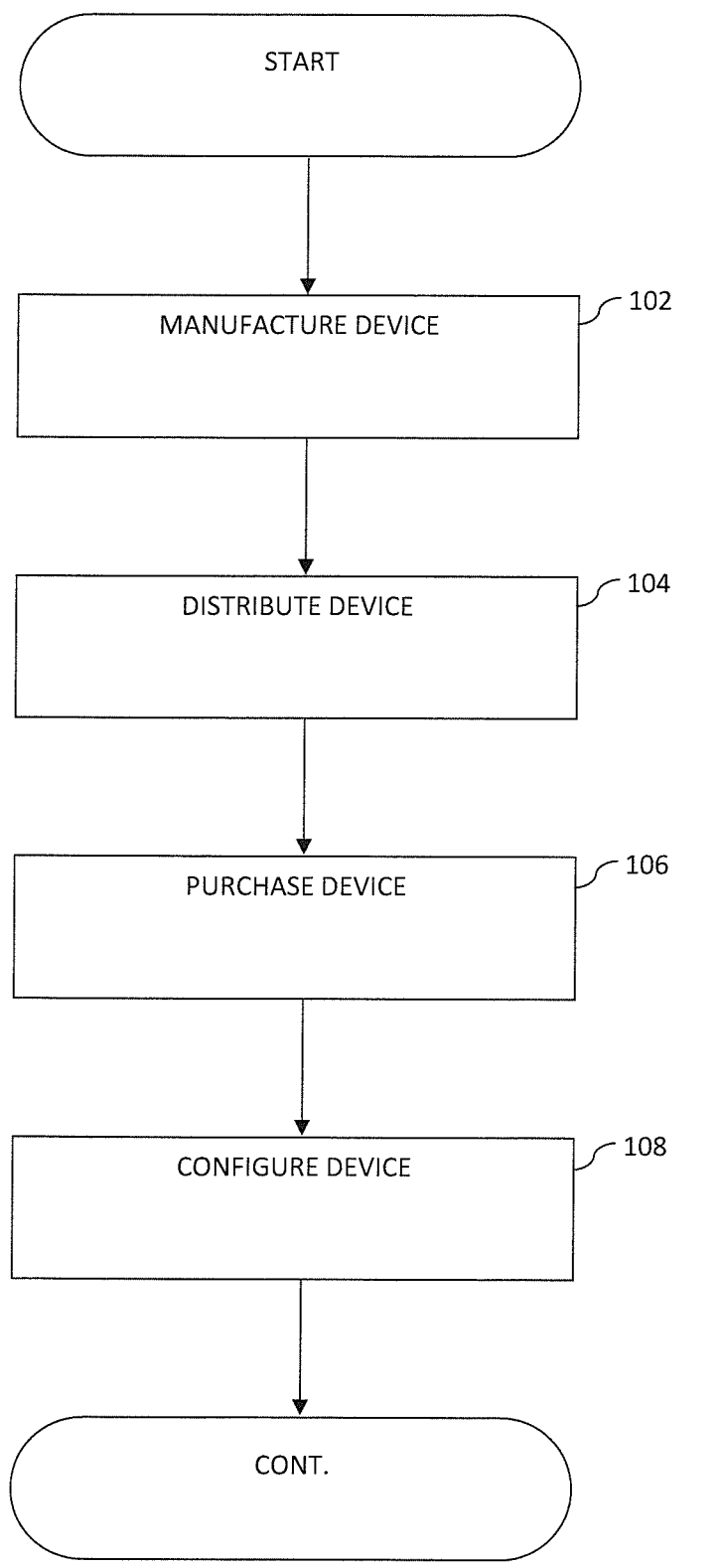
FIG. 1 is a logical flow diagram of one embodiment of a generalized distribution scheme for cellular devices, in accordance with the present disclosure.

All Figures © Copyright 2013 Apple Inc. All rights reserved.

DETAILED DESCRIPTION

Reference is now made to the drawings, wherein like numbers refer to like parts throughout.

Overview

Typically, when a customer purchases a mobile device, the mobile device is manually configured with a one-time startup program via a graphical user interface (GUI) interface. This one-time startup program customizes the purchased device for the customer based on e.g., network configuration data, customer data, etc. Existing one-time startup programs detract from the overall purchase experience by, for example, requiring user input; thus, various aspects of the present disclosure are directed to more automatic configuration of a mobile device.

In one embodiment, a powered-off mobile device can be programmed with configuration data while "in the box" (e.g., at a point of sale (POS), in a warehouse, etc.), using in one variant a near field communication (NFC) data interface. Thereafter, when the customer powers on the device for the first time, the primary device processor inspects its NFC memory and after verifying the configuration data, automatically configures itself without customer intervention. From the customer's perspective, the mobile device is advantageously ready for use immediately.

Various other useful applications for the methods and apparatus described herein will be recognized by artisans of ordinary skill, given the contents of the present disclosure. For example, information that is stored to a NFC accessible memory can be accessed when the device is unpowered e.g., to retrieve backup data, to perform financial transactions, or yet other useful functions.

Existing Distribution Networks

As a brief aside, certain cellular technologies support so called Subscriber Identity Module (SIM) cards. SIM cards contain a user's identity information, and can be transferred between SIM-capable devices. SIM technologies provide a persistent user identity over the lifetime of the customer's contracted service agreement(s). When a SIM card is first manufactured, the SIM card is not tied to any particular user's account. Once the customer purchases the SIM card, the customer's account at a carrier is tied to the SIM card during an activation process. Thereafter, the SIM card can be used by that customer as a persistent identity in any SIM-capable device, to obtain network services from the carrier.

One common business model for cellular network operators is to provide an otherwise expensive device at a loss, such that the cellular network operator can recoup the cost of the subsidy with a service contract. Carrier subsidy practice enables carriers to embed the true cost of expensive devices within a reasonable service fee, paid over a contract period, thus enabling a broader market for consumption. The term "subsidy lock" as used herein refers generally and without limitation to the mechanism by which the device is locked to operate only with the appropriate carrier. In existing solutions, subsidy lock is often difficult to enforce, as the SIM card is locked to the carrier, not the device itself.

Referring now to FIG. 1, one embodiment of a generalized distribution scheme 100 for cellular devices for use with a cellular network is presented.

As shown, at step 102, a cellular device is provided, such as via being manufactured by the device manufacturer. Certain device manufacturers produce generic devices which have software and/or hardware which is compatible with a wide array of cellular network operators. Other device manufacturers produce devices that have specialized software and/or hardware for one or more cellular network operators. Since each network operator may have certain idiosyncrasies and/or supported/unsupported features, one common practice is to postpone the device's network configuration until after the device has been assigned to a cellular network operator.

At step 104, the device is distributed to one or more device point-of-sale (POS) locations. In some cases, the POS location is a physical location (e.g., a mall kiosk, storefront, etc.). Alternately the POS location may be a virtual location (e.g., a website, etc.). Depending on the POS scheme, the device may or may not already be associated with a particular cellular network operator. Different POS schemes are associated with different business models which may further impact the device configuration (e.g., subsidy information, contract information, etc.). For example, the POS may charge a commission, offer additional features, offer incentives, etc.

At step 106, the device is purchased by a customer, and thereafter at step 108, the device is configured for use with the network based on the e.g., cellular network operator, the POS information, and the customer information.

Within the context of the foregoing distribution scheme, the details necessary to complete device configuration are not known until the POS has sold the device to the customer. Consequently, existing configuration is usually performed by e.g., the customer, by a sales associate while the customer is waiting, etc. For example, when purchasing an iPhone® (manufactured by the Assignee hereof) from an Apple Store®, the customer typically powers the iPhone on to execute a one-time startup configuration program that e.g., requests a desired cellular network operator and plan, requests credit card data, location, etc. Since existing configuration schemes are based on the one-time startup configuration program (which requires the device to be powered to be executed), the one-time startup program is always executed the first time an iPhone is powered on and used.

Various solutions have attempted to address device pre-configuration. For example, certain resellers may remove the device from packaging, and pre-program the device before providing the device to the customer. In other cases, devices are actually made to order (i.e., the customer orders a device, which is subsequently programmed and shipped). Both of the foregoing solutions are undesirable from the perspective of reduced user experience and/or logistical complications.

Methods

Various embodiments of the present disclosure are directed to schemes for substantially automatic mechanisms for configuration and/or management of an unpowered device, such as via near-field communication technology.

In one embodiment, new and improved schemes for device activation enable a device to be programmed with appropriate configuration information while unpowered (e.g., before initial power-up). In one exemplary usage scenario, a purchased device (still in the box, and unpowered) can be configured for the purchasing customer via a near-field wireless link. Once configured, the purchased device can be given to the customer. The customer can immediately use the device without the GUI-based one-time startup program. In one implementation, the one-time startup program is executed in the background without the user's input.

More generally, it should be appreciated that multiple other applications are enabled by mechanisms for configuration and/or management of an unpowered device (such as for example using NFC technology). For instance, a device may store information to near-field accessible storage. In this manner, the device can provide access to this information even when unpowered. For instance, in one such exemplary use case, the device can store back-up data to the near-field accessible storage; if the device is suddenly rendered inoperable (e.g., damaged, etc.), the stored back-up data can be recovered. In other instances, the device can be used to store and/or perform data transactions (e.g., financial transactions, etc.) even in an unpowered state.

Figure 2:
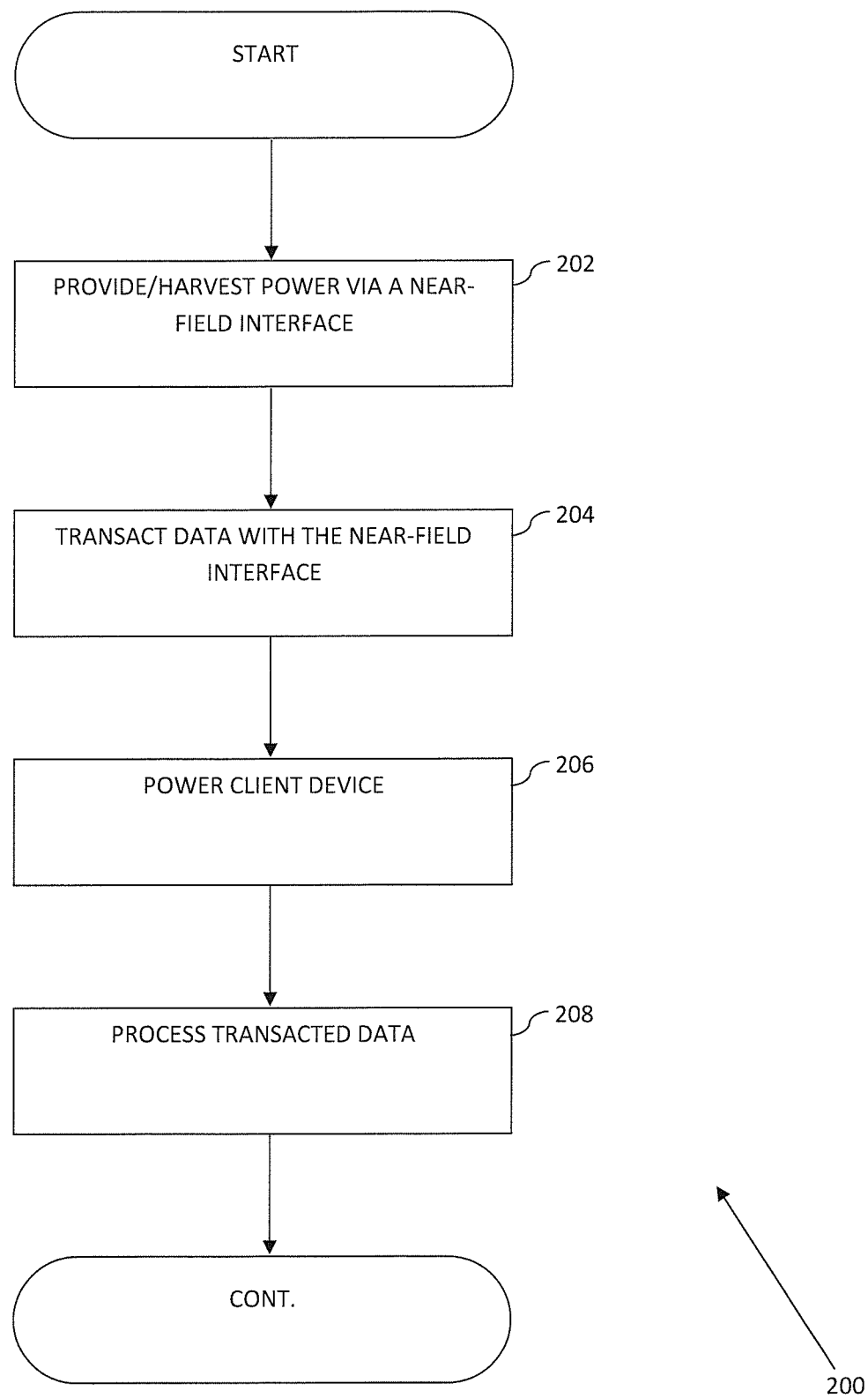
FIG. 2 is a logical flow diagram of one embodiment of a generalized method for reading/writing data from/to a powered down device, in accordance with the present disclosure.

Referring now to FIG. 2, one embodiment of a generalized method 200 for reading/writing data from/to a powered-down device is provided.

At step 202, an interrogator device provides power via a near-field technology to a near-field element of an otherwise unpowered interrogated device. As is described in greater detail herein, various implementations of the interrogated device include an NFC communication interface which can be powered via existing passive-enabled NFC technologies. More directly, the NFC interface harvests or utilizes power sufficient to perform the necessary operation (e.g., read, write, data manipulation, etc.), from the interrogator device.

As a brief aside, existing NFC technologies are based on magnetic induction between two loop antennas (one within the interrogator device and one within the interrogated device). NFC technologies generally support two operational modes: "passive" and "active". In passive operation, the interrogator device provides a carrier field and the interrogated device responds by reflecting a modulated version of the carrier field. In active operation, the interrogator device and interrogated device alternate between generating a respective carrier field. Active variants require the interrogated device to have its own power supply. Current NFC devices operate within the globally available and unlicensed radio frequency ISM band of 13.56 MHz.

Moreover, devices may be capable of both active and passive operation, such as for example those compliant with the well-known EMVCo standards, which are incorporated herein by reference in their entirety. Hence, as used herein, the term "passive" also is intended to include devices which have a passive mode of operation (i.e., which are not solely passive).

While NFC technologies are one illustrative technology, it is appreciated that virtually any wireless low-power/no-power technology may be interchangeably substituted within the various aspects described in the present disclosure. For example, future devices may incorporate e.g., inductive charging (also known as "wireless charging") and/or other forms of wireless communication.

It is further appreciated that while the following discussions are primarily described within the context of passive NFC, active NFC variants which include a small power supply to supply power to the NFC interface are also envisioned. In some situations, the power supply may be a single use power supply. For example, the power supply may be part of the packaging (e.g., the box may be equipped with a small battery that provides power to the interrogated device).

In one exemplary embodiment, the interrogated device includes one or more other processors which are distinct from the NFC interface. The NFC interface is configured to read/write to an accessible memory element. The memory element is further configured to be accessible to the one or more other processors, when the processors are powered.

In one implementation, the accessible memory element is an EEPROM or Flash memory which resides in a subscriber identity module (SIM) card. In other implementations, the accessible memory element is a secure element (e.g., an electronic universal integrated circuit card (eUICC)) that is configured to operate in the same manner as a SIM card, such as that described in co-owned, co-pending U.S. patent application Ser. No. 13/095,716 filed on Apr. 27, 2011, and entitled "APPARATUS AND METHODS FOR DISTRIBUTING AND STORING ELECTRONIC ACCESS CLIENTS", Ser. No. 13/080,558 filed on Apr. 5, 2011, and entitled "APPARATUS AND METHODS FOR CONTROLLING DISTRIBUTION OF ELECTRONIC ACCESS CLIENTS", Ser. No. 13/093,722 filed on Apr. 25, 2011, and entitled "APPARATUS AND METHODS FOR STORING ELECTRONIC ACCESS CLIENTS", each of the foregoing incorporated by reference in their entireties. Those of ordinary skill in the related arts will readily appreciate that still other faints of embedded secure elements may be substituted or used in conjunction with the foregoing, given the contents of the present disclosure.

At step 204, data is transacted with the near-field element of the otherwise unpowered interrogated device.

In one exemplary embodiment, the data comprises one or more configuration data. For example, within the context of the distribution scheme of FIG. 1, the step of configuring the device for the customer may be performed via the NFC interface. More directly, the device (still in the box), is programmed with the configuration data via the interrogator device. In some cases, the data consists of appropriate parameters (e.g., customer information, network carrier information, credit card information, etc.) which can be subsequently used by the processors (when powered on) to configure the device accordingly. In other embodiments, the data may be a program which when executed by the appropriate processors (when powered on), configures the device properly.

As a point of clarification, various embodiments of the present disclosure are configured to cache or otherwise store the transacted data until the interrogated device is actually powered on (see subsequent steps 206 and 208). It is additionally noted that for certain implementations, the configuration process can end at this step without further operation (e.g., where the NFC interface can be used to directly program a SIM card or secure element, etc.).

In another exemplary embodiment, the transaction comprises receiving one or more back-up data. For example, within the context of a broken (or otherwise unpowered device), the back-up data can be retrieved without requiring e.g., the device to power up. This may be particularly useful when, e.g., the interrogated device has a fatal error that prevents the operating system (OS) from booting, or the interrogated device cannot power up due to a faulty battery. More generally, it will be appreciated that back-up data is most commonly needed in scenarios where the device is unable to operate normally.

As a brief aside, exemplary backup data operation requires that the NFC accessible memory is populated with the user's backup data during normal operation. Various embodiments of the present disclosure may provide backup data via e.g., periodic updates, user-triggered updates, event-triggered situations (e.g., program installation, OS installation, etc.). In some cases, the user may be prompted to select what types of data are protected (e.g., contact information, transaction information, etc.).

Referring back to step 204, in still other embodiments, the transaction comprises one or more financial transactions, geographic check-ins, etc. As a brief aside, one significant commercial application for mobile devices is as a financial instrument proxy (e.g., as a replacement for cash, and/or credit/debit cards, etc.). While existing schemes for mobile device payment are largely directed to software applications which interact with vendor counterparts, it should be appreciated that these schemes require the device to be powered to function. Accordingly, by enabling such simple transactions to be performed via a passive NFC interface, a device user can continue to use their device for transactions when the device has run out of batteries, or is otherwise unpowered.

Those of ordinary skill in the related arts will recognize that data transactions can include any of e.g., reads, writes, and/or data manipulations. In some cases, the device may be able to execute simple programs, transactions, etc. Current NFC integrated circuits support data rates of 106 Kbits (Kb)/s, 212 Kb/s, and/or 424 Kb/s, and are manufactured with up to 1 MByte (MB) of accessible memory (typically, Flash or EEPROM non-volatile memory). The effective range of NFC is approximately four (4) cm. Future incarnations of the NFC technology will improve data rates, accessible memory space, and effective ranges, further increasing the possible applications of the present disclosure. Common examples of data include, without limitation: user data (e.g., phonebook data, passwords, etc.), financial data, and network configuration data.

In some embodiments, the NFC interface may be further configured to access memory within a SIM card or other secure element. For example, the NFC interface may be capable of directly programming a SIM card with e.g., ICCID (integrated circuit card identifier), IMEI (international mobile equipment identifier), application data, etc. For certain secure element based embodiments, the NFC interface may be able to program a complete eSIM, such as is described within co-owned, co-pending U.S. patent application Ser. No. 13/095,716 filed on Apr. 27, 2011, and entitled "APPARATUS AND METHODS FOR DISTRIBUTING AND STORING ELECTRONIC ACCESS CLIENTS", Ser. No. 13/080,558 filed on Apr. 5, 2011, and entitled "APPARATUS AND METHODS FOR CONTROLLING DISTRIBUTION OF ELECTRONIC ACCESS CLIENTS", Ser. No. 13/093,722 filed on Apr. 25, 2011, and entitled "APPARATUS AND METHODS FOR STORING ELECTRONIC ACCESS CLIENTS", previously incorporated by reference in their entireties.

Referring back to FIG. 2, at a later time the client device is powered per step 206. During power up, the device initializes its processor and software processes. Generally, the processor will start an operating system (OS), and initialize one or more software applications.

In one embodiment, the processor determines if the NFC memory (or applicable SIM and/or secure element memory) has been modified while it was unpowered. In some cases, the processor may check the NFC memories directly. Alternately, the processor may check one or more hash values, or use yet other indications of whether the memory has been modified (such as for instance indirect indicia of memory access).

In some embodiments, the check may be performed automatically; e.g., each time the device is powered, or only the first time the device is powered, etc. Alternatively, the check may be performed on a triggered or manual basis; e.g., responsive to a time/location criteria, software query, user input, or other event. In still other embodiments, the check may be periodically performed and/or polled, such as according to a polling schedule. Various other schemes for checking data change history useful with the present disclosure are well known within the related arts, and accordingly not described further herein.

If the memory contents have changed, then the processor continues to step 208. Otherwise, if the memory contents have not changed, then the processor can exit the method 200.

At step 208, the client device processes the transacted data (if any).

In one exemplary embodiment, the device uses the transacted data to activate the device. For example, a customer opens the device packaging (also referred to as "unboxing"), and turns on their newly purchased phone. As part of the boot procedure, the device checks a NFC accessible memory (e.g., SIM card, eSIM, etc.) to determine if network configuration data and/or customer preference data has been updated, initialized for the first time, changed, etc. Thereafter, the device can run its configuration program on the updated, initialized, and/or changed data.

In another embodiment, the device uses the transacted data to update software applications. For instance, the device may be able to store certain transactional information (e.g., financial transactions, location information, etc.). Once the device has powered back on, the previously stored information can be used to update the appropriate applications (e.g., a financial tracking program, or location tracking program).

Apparatus

Figure 3:
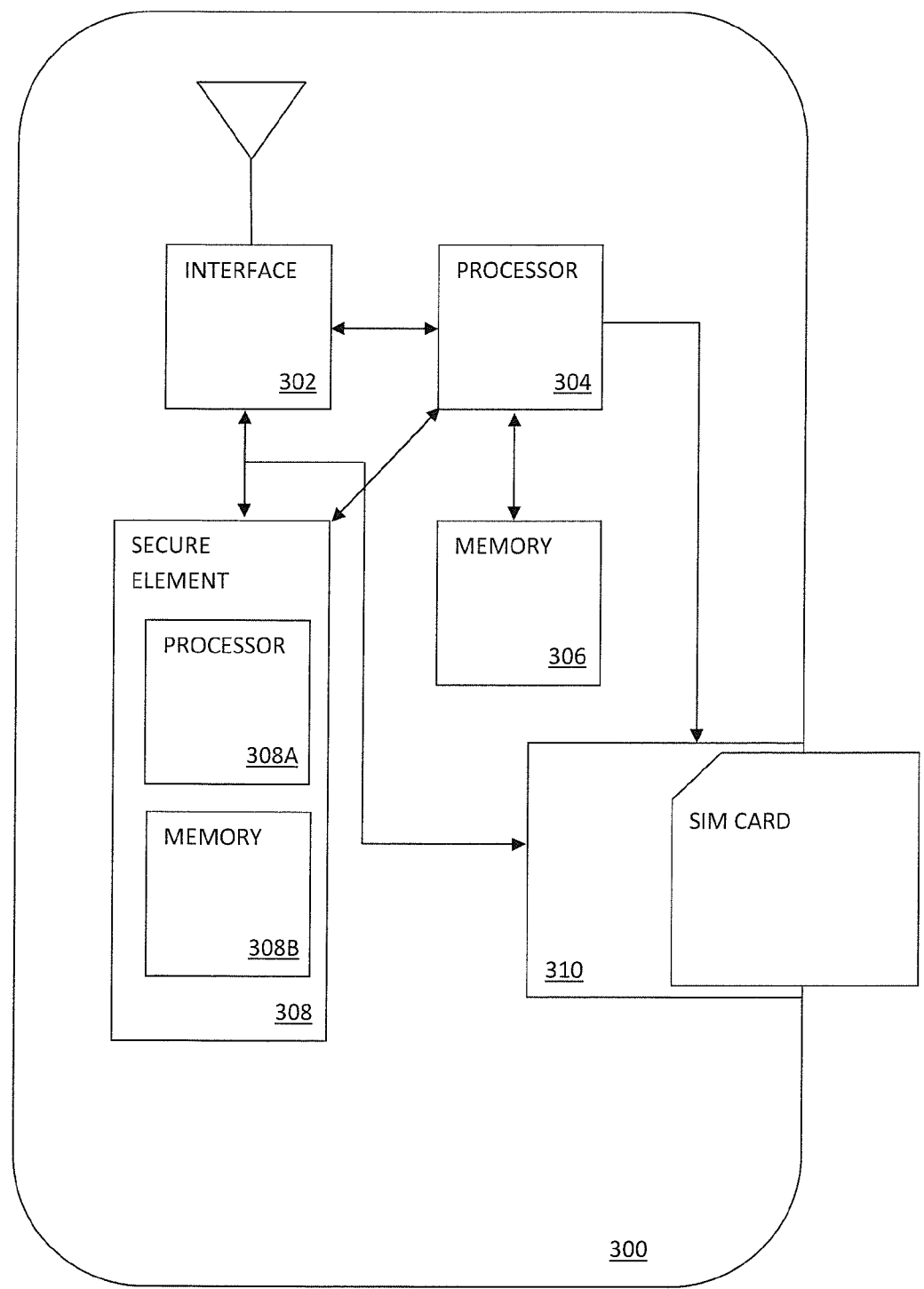
FIG. 3 is a logical block diagram representing one exemplary embodiment of a client device useful in conjunction with the methods and apparatus described herein.

Referring now to FIG. 3, one exemplary client device 300 is illustrated. As used herein, the term "client device"

includes, but is not limited to, devices which are configured to transact and/or manage data over a passive-enabled interface. Common examples of client devices are, inter alia, wireless-enabled cellular telephones, smartphones (such as for example an iPhone® manufactured by the Assignee hereof), wireless enabled personal computers (PCs), mobile devices such as handheld computers, PDAs, personal media devices (PMDs), wireless tablets (such as for example an iPad® manufactured by the Assignee hereof), so-called "phablets", or any combinations or variants of the foregoing.

As is described in greater detail hereinafter, the exemplary embodiment of the client device 300 is configured to operate according to a first "interrogated" mode, and a second normally powered mode.

The illustrated client device 300 includes a passive-enabled interface 302, a processor subsystem 304, a memory subsystem 306, a secure element 308 such as an embedded UICC, and/or a SIM/UICC card receptacle 310 configured to house a SIM/UICC card. In some variants, the secure element 308 further includes a secure processor 308A and a secure non-transitory computer readable medium 308B. In some variants, the SIM includes a secure processor 310A and a secure non-transitory computer readable medium. The processor subsystem 304 may include one or more of a digital signal processor, microprocessor, field-programmable gate array, or plurality of processing components mounted on one or more substrates. The processor subsystem 304 may also comprise an internal cache memory. The processor subsystem 304 is in communication with the memory subsystem 306, the latter including memory which may for example comprise SRAM, flash, and/or SDRAM components. The memory subsystem 306 may implement one or a more of DMA type hardware, so as to facilitate data accesses as is well known in the art. The memory subsystem 306 of the exemplary embodiment contains computer-executable instructions which are executable by the processor subsystem 304.

In one implementation, the one or more passive-enabled interfaces 302 are configured to wirelessly connect to a reader/interrogator interface of an interrogator device (described subsequently hereinafter). The interface 302 may be a contactless interface based on magnetic induction, such as the aforementioned near-field communication (NFC) technology. A NFC device can communicate with a contactless front end (CLF) without using indigenous battery power of the device by inductively "harvesting" power from the RF signals emitted by the interrogator device as previously described herein.

The one or more passive-enabled interfaces 302 are further coupled to a passively accessible memory structure. During passive operation, the passively accessible memory structure can be read from and/or written to, without requiring the indigenous battery or other power of the device (i.e., the power for reading/writing is supplied from the power harvested by magnetic induction). In some embodiments, the one or more passive interfaces 302 may additionally have access to a processor which is configured to operate passively (i.e., the power for processor execution is supplied from the power harvested by magnetic induction). In some variants, the one or more passive interfaces may be coupled to a low-power, battery backed memory and/or processor where e.g., cost and/or implementation considerations prevent the use of fully passive operation, or where fully passive operation is unnecessary.

In the illustrated embodiment, the client device includes a secure element 308 and/or SIM 310. The secure element 308/SIM 310 may include a processor executing software stored in a media. The functionality of the secure element and SIM are similar and are interchangeable in operation (except where noted).

In one exemplary embodiment, the SIM on the client device contains an IMSI (International Mobile Subscriber Identity) to identify an account, a K or $K_i$ (Authentication key for GSM and/or 3G technologies) to authenticate the client device on a network, and an International Circuit Card ID (ICCID) that serves as a serial number for the SIM. The SIM 310 is capable of receiving, transferring and storing information relating to an activation process. In one embodiment, the SIM stores an array of information that can be used for activating a client device. Stored data may include programs and data for e.g., security (for example: authentication programs, authorization programs, and cryptographic materials to protect communications with other entities, network operator preferences, user data (e.g., from previous contract history), etc.), user management (e.g., account activation information, recent transaction history, etc.), or yet other data. In one variant, the SIM contains data and/or applications stored in memory by a manufacturer or service provider of the client device. For example the SIM may contain ICCID and IMEI data pre-stored in its memory.

As shown, the secure element 308 and SIM 310 are connected to the one or more passive (enabled) interfaces 302 via a first interface. In one embodiment, the first interface is a single wire protocol (SWP) interface. In some implementations, the SWP interface can read/write to the SIM/secure element during passive operation.

In other embodiments, the first interface can be used when the device has power to retrieve data cached during passive operation. Those of ordinary skill in the related arts will readily appreciate that the described SWP interface is purely illustrative; other implementations may incorporate for example other interface technologies and/or protocols.

During the interrogated mode of operation, the SWP interface allows the client device to provide access to certain programs and memory objects without using the indigenous power supply. An interrogator device can read/write information on a SIM via the NFC interface. Any contactless device, such an interrogator device, may be used to communicate with a SIM card/secure element via a SWP interface. This allows a client device to be activated (such as at a point of sale) without requiring power to the client device, and/or removal of the client device from its packaging. Furthermore, this feature advantageously enables a user to retrieve any data stored on the SIM when the device is not fully operational (such as battery failure, processor failure, software failure, etc.)

The secure element 308 and SIM 310 are also connected to the processor 304 via a second interface. In one embodiment, the second interface is compliant with the ISO 7816 smart card standards. The second interface can be used by the processor to, inter alia, access the SIM/secure element, and/or the one or more passive interfaces 302.

When the processor 304 is powered on and the device is operating under its normally powered mode, the processor can check for any passively captured client-interrogator transaction data. If a transaction has occurred, the processor 304 can retrieve the cached transaction data, and perform the appropriate operation (e.g., configuration according to a cached network configuration file, etc.).

In some embodiments, the client device may additionally include other components such as e.g., a user interface subsystem that includes any number of well-known I/O including, without limitation: a keypad, touch screen (e.g., multi-touch interface), LCD display, backlight, speaker, and/or microphone. It is recognized that in certain applications, a user interface may be unnecessary. For example, card-type client embodiments may lack a user interface.

Interrogator Device

As used herein, the term "interrogator device" includes, but is not limited to, devices which are configured to transact data and/or configure an unpowered client device. Common examples of interrogator devices include e.g., configuration apparatus for point of sale (POS) vendors (e.g., at a sales kiosk, corporate store, etc.), equipment for third party maintenance, mobile checkout readers, and appropriately equipped computers/servers, etc. More broadly, interrogator devices may be used to perform e.g., activation, transact goods and/or services, provide virtual consideration, obtain or deposit funds or credit, redeem coupons, transact data, etc. In some embodiments, NFC technologies may also be implemented within e.g., mobile wireless tablets, and smartphones, etc.

Additionally, as noted above, client devices may include both active and passive capabilities/modes, and hence "interrogator" devices may in fact operate as a passive or receiving device when the client is operating in an active mode.

Figure 4:
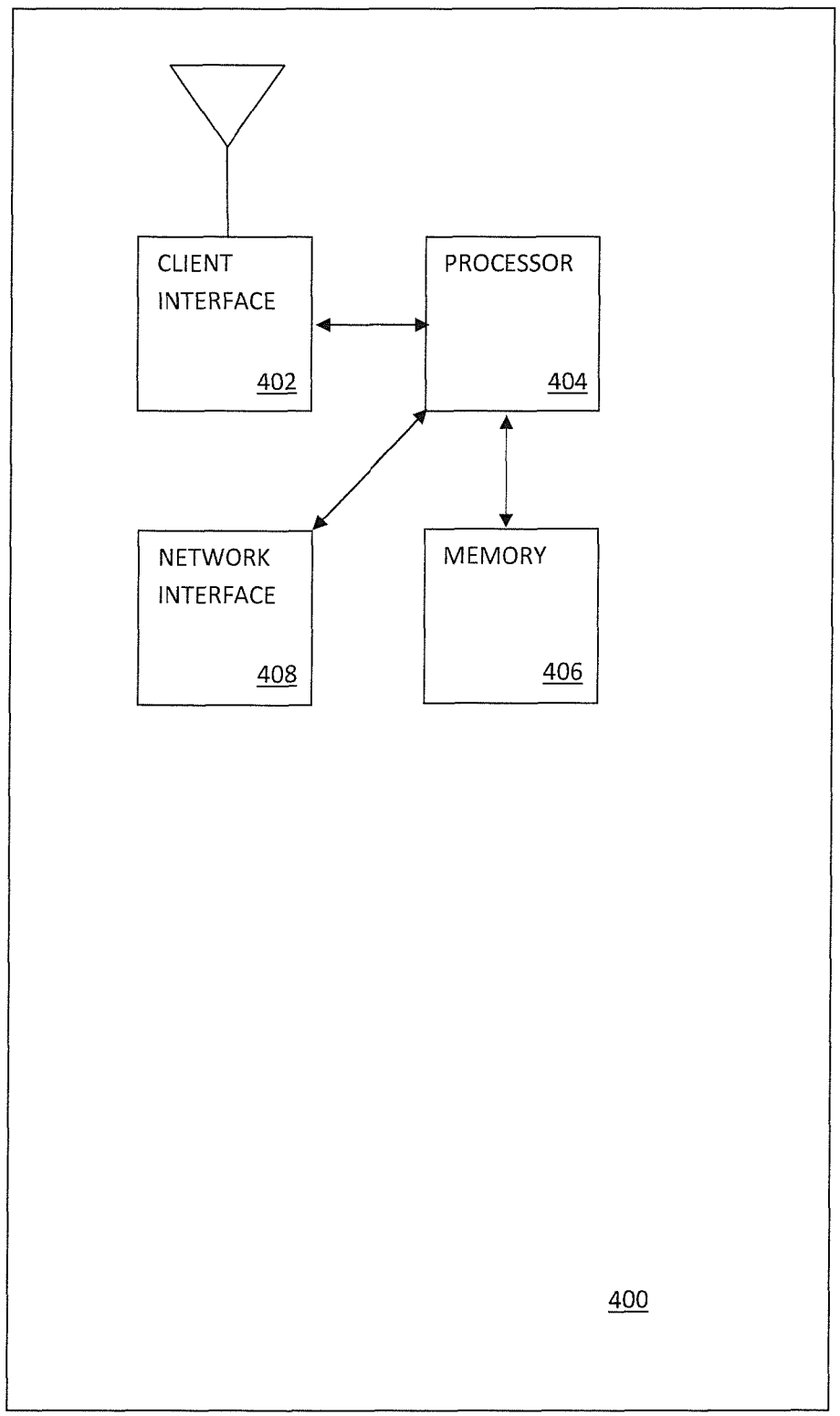
FIG. 4 is a logical block diagram representing one exemplary embodiment of an interrogator device useful in conjunction with the methods and apparatus described herein.

Referring now to FIG. 4, one exemplary interrogator device 400 is presented. The exemplary interrogator device includes: a client-interrogator interface 402, a processor subsystem 404, a memory subsystem 406, and a network interface 408.

The processor subsystem 404 may include one or more of a digital signal processor, microprocessor, field-programmable gate array, or plurality of processing components mounted on one or more substrates. The processor subsystem 404 may also comprise an internal cache memory. The processor subsystem 404 is in communication with a memory subsystem 406 including memory which may for example, comprise SRAM, flash, and/or SDRAM components. The memory subsystem 406 may implement one or a more of DMA type hardware, so as to facilitate data accesses as is well known in the art. The memory subsystem 406 contains computer-executable instructions which are executable by the processor subsystem 404.

In one exemplary embodiment, the interrogator device comprises one or more interfaces 402 adapted to connect to or communicate with a client device. The interface 402 is a "touch" type interface which uses short operating ranges (e.g., RFID (RF Identification), NFC (Near Field Communication), etc.).

In some embodiments, the interrogator device may additionally include other components such as e.g., a user interface subsystem that includes any number of well-known I/O including, without limitation: a keypad, touch screen (e.g., multi-touch interface), LCD display, backlight, speaker, and/or microphone. It is recognized that in certain applications, a user interface may be unnecessary. For example, simple interrogator devices may only provide a simple touch pad and an audible acknowledgment (beep, click, etc.) to indicate a successful transaction.

In the illustrated embodiment, the interrogator device includes a network interface 408; where the network interface 408 is configured to securely report a transaction and/or backup the retrieved data with one or more servers or "cloud" entities. In some variants, each transaction may additionally be stored within a secure file system for future reference/bookkeeping. Common examples of a network interface include, without limitation: Ethernet, Digital Subscriber Line (DSL), Cable, Hybrid Fiber Coaxial, WiMAX, WLAN, cellular data connections, etc. For example, in one exemplary usage scenario, client device/network configuration data can be provided to/from the interrogator device to a cellular network operator. In other cases, the interrogator device may be connected to a user's local backup system and/or a cloud backup service. In still other examples, the interrogator device can be coupled to an appropriate facility for providing transactional data (e.g., a financial institution, etc.).

In some embodiments, the interrogator device may have associated device cryptographic keys or other cryptographic capabilities, such as without limitation AES/DES encryption, IPSec, MIKEY, SSL/TTL. These device keys (and/or other features) can be used to secure exchanges. In one such variant, the cryptographic keys are an asymmetric public/private key pair. In still other variants, the cryptographic keys are a symmetric key pair (i.e., a shared secret). In other variants, the interrogator device may have a number of cryptographic keys for verifying and/or issuing digital certificates of various degrees of security/privilege. More generally, it is appreciated that the client-interrogator interface 402 may have various degrees of encryption applied thereto, such as to encrypt sensitive user or payment information during transmission.

During an exemplary client-interrogator transaction, the interrogator device attempts to access one or more memories and/or communicate with a processor associated with a SIM on the client device. For example, the interrogator device may receive (or request) the client device's activation-specific or user-specific data stored in SIM memory. In one variant, the interrogator device reports the transaction to a backend server to support further activation of the client device or server storage of user data.

Example Operation

Figure 5:
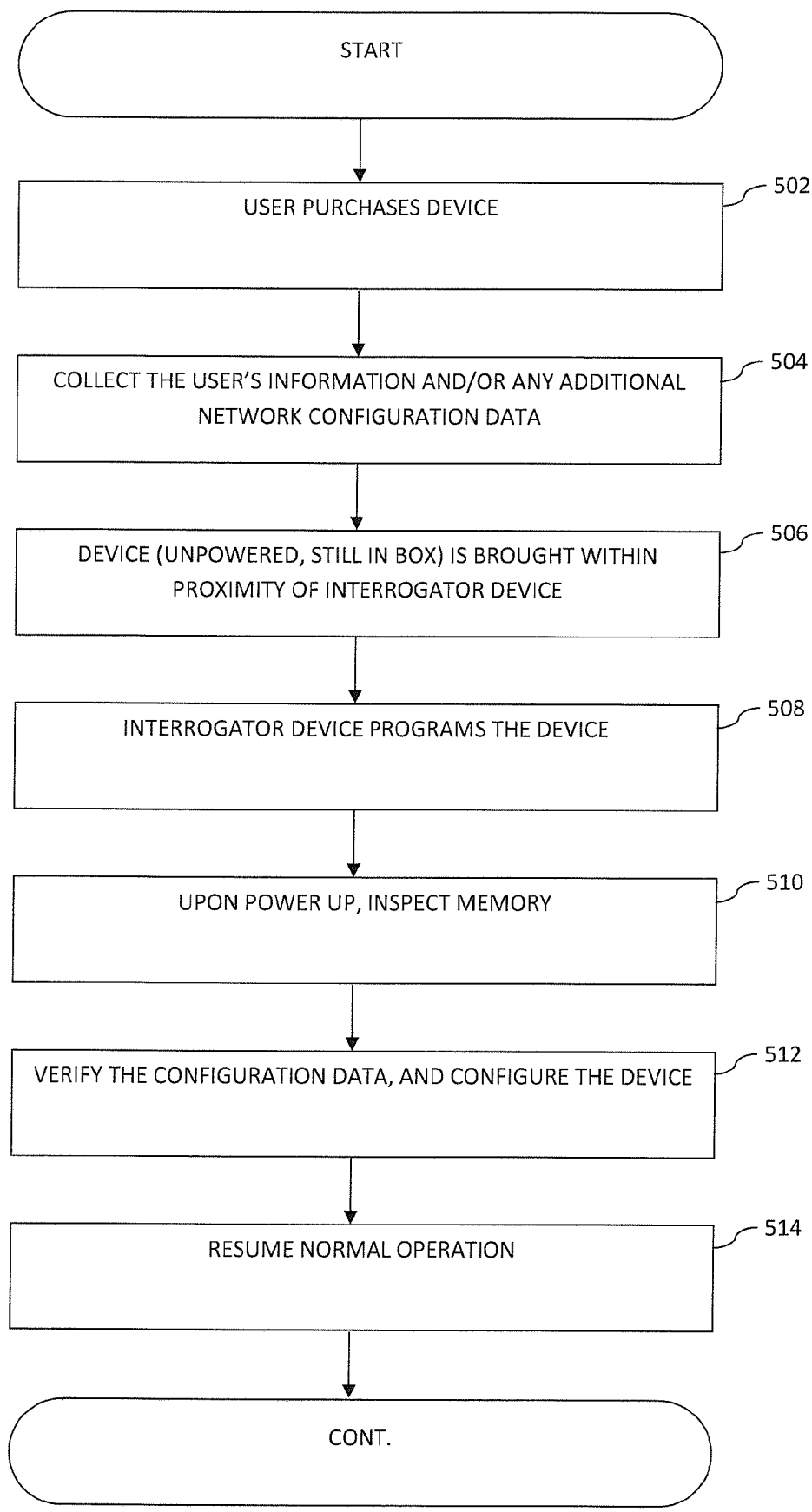
FIG. 5 is a logical flow diagram of one exemplary embodiment of a near-field based approach for configuration of an unpowered device.

Referring now to FIG. 5, one exemplary transaction 500 conducted according to the present disclosure is illustrated.

At step 502, a user purchases a wireless device at a real or virtual point of sale (POS), such as at a store, or over the Internet; the wireless device will typically include a Subscriber Identity Module (SIM), Universal Integrated Circuit Card (UICC), Removable User Identity Module (RUIM) or similar removable device that allows users to switch devices by simply removing the module or card from one mobile device and inserting it into another wireless device. In other scenarios, the wireless device includes a secure element (which is not removable) which performs the functions of a SIM.

At step 504, the POS collects the user's information and/or any additional network configuration data. As previously noted, SIM type components (e.g., SIM cards, secure elements, etc.) store network specific information used to authenticate and identify subscribers on a network. This information can include an International Circuit Card ID (ICCID), International Mobile Subscriber Identity (IMSI), Authentication Key (Ki), Local Area Identity (LAI). SIM cards are identified on their individual operator networks by holding a unique IMSI. Mobile operators communicate with their devices that have SIM cards using their IMSI. The mobile device itself will often have a unique serial number or ID, such as an International Mobile Equipment Identity (IMEI).

Additionally, in some cases, the user may have previous data to transfer to the wireless device (which can be retrieved via a separate "backup" data transfer). For example, the user may take their older existing phone and "bump" their existing phonebook, preferences, etc. to the kiosk's memory, using an NFC or other wireless technology. The bumped data can then be added to the data that is queued for the new phone.

At step 506, the device (unpowered, still in box) is brought within proximity of the POS interrogator device. The interrogator device powers the passive interface of the device over the contactless NFC interface. In some distribution schemes this is performed by the customer (or retail associate), in other schemes the device is programmed (in box) at a distribution point (e.g., a warehouse, device manufacturer, etc.) and programmed before shipment. In the case of a POS/store, the reader may be for instance disposed on the sales counter. In the exemplary "virtual" scenario, the user can proceed with the boxed device (once received) to the POS, or alternatively utilize another approach, such as a local interrogator at the user's premises. For instance, the present disclosure contemplates that users may maintain their own NFC interrogator terminal (such as one coupled to their PC or laptop, a set-top box, a "Smart" TV, or other premises device), the interrogator being controllable either locally, or by a remote entity (e.g., via the user's broadband connection). Likewise, other NFC-enabled devices such as smartphones or tablet computers may, with proper configuration, act as a "programming proxy", thereby obviating the user having to go to a POS to conduct the programming.

At step 508, the POS or other interrogator device programs the client device via the contactless NFC interface. In one exemplary embodiment, the NFC interface is directly coupled to the SIM card (secure element, etc.) of the client device via a single wire protocol (SWP) interface. The SWP interface is further configured to provide passive read/write access to the SIM memory.

In some cases, the interrogator device/client device may additionally perform one or more security transactions and/or negotiate one or more privileges. For example, the interrogator device may be required to successfully authenticate itself, in order to read/write to the SIM memory. In some scenarios, the configuration data may be encrypted, signed, password protected, (or otherwise secured) in addition to, or in lieu of, a security protocol.

In certain variants, the interrogator device also reads data from the client device that it forwards to the appropriate network operator. For example, the client device may provide a unique identifier (e.g., IMEI, IMSI, etc.) which the network operator must link to a customer account (e.g., customer billing information, etc.).

Subsequently thereafter, the customer opens the package and powers on the client device. On power up, the primary device processor inspects its SIM memory (step 510) via an ISO 7816 SIM card interface, and after verifying the configuration data (step 512), configures itself accordingly. In some cases, verification may be based on cryptographic security, digital signature, etc. For example, the configuration data may be signed with a cellular network operator's certificate, if the certificate is valid then the configuration data is valid. The client device can automatically execute a one-time startup configuration program that e.g., sets the desired cellular network operator and plan, stores the customer's credit card data, location, etc.

At step 514, the device resumes normal operation; the customer is unaware of the configuration step and can immediately use their fully functional and completely configured device.

It will be recognized that while certain features are described in terms of a specific sequence of steps of a method, these descriptions are only illustrative of the broader methods disclosed herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art. The foregoing description is of the best mode presently contemplated. This description is in no way meant to be limiting, but rather should be taken as illustrative of the general principles described herein.

What is claimed is:

1. A wireless device, comprising:
an indigenous power supply;
a near-field communication interface, the near-field communication interface configured to utilize energy radiated from an external interrogator device, the near-field communication interface further configured to receive configuration data while being powered by the energy radiated from the external interrogator device and without receiving power from the indigenous power supply;
a memory structure configured to store the configuration data received from the external interrogator device;
a processor; and
a non-transitory computer readable medium comprising one or more instructions configured to, when executed by the processor, cause the wireless device to:
determine whether the memory structure has been modified while the near-field communication interface was being powered by the energy radiated from the external interrogator device, and
when the memory structure is determined to be modified:
retrieve the configuration data from the memory structure,
verify the configuration data, and
configure the wireless device based on the configuration data after verifying the configuration data.

2. The wireless device of claim 1, wherein the memory structure comprises a subscriber identity module (SIM) card.

3. The wireless device of claim 1, wherein the configuration data comprises one or more network specific parameters useful for authentication and identification.

4. The wireless device of claim 1, wherein the one or more instructions are configured to be executed by the processor when the wireless device is powered on.

5. The wireless device of claim 1, wherein the configuration data of the wireless device comprises a one-time startup configuration program.

6. The wireless device of claim 1, wherein the memory structure comprises a non-removable secure element of the wireless device.

7. The wireless device of claim 1, wherein the configuration data is based on one or more customer defined parameters.

8. The wireless device of claim 7, wherein the one or more customer defined parameters are determined when a customer orders the wireless device.

9. A method of configuring an unpowered mobile device, comprising:
at the unpowered mobile device:
harvesting energy radiated from an external interrogator device via a near-field communication interface;

receiving configuration data via the near-field communication interface; and storing the configuration data received via the near-field communication interface to a passive memory structure; and responsive to the unpowered mobile device being powered up:

determining whether the passive memory structure has been modified while the near-field communication interface was harvesting the energy radiated from the external interrogator device, and when the passive memory structure is determined to be modified:

retrieving the configuration data from the passive memory structure, verifying the configuration data, and configuring the mobile device based on the configuration data after verifying the configuration data.

10. The method of claim 9, wherein the configuration data is received prior to shipping the unpowered mobile device to a customer.

11. The method of claim 10, wherein the configuration data comprises one or more network specific parameters.

12. The method of claim 10, wherein the configuration data comprises one or more user specific parameters provided during a customer ordering process.

13. The method of claim 9, wherein the configuration data is received at a point of sale (POS).

14. The method of claim 9, where the configuration data is received at a distribution warehouse.

15. The method of claim 13, where the configuration data comprises one or more user specific parameters or device specific parameters determined by the POS.

16. The wireless device of claim 1, wherein the wireless device is configured to determine whether the memory structure has been modified based on one or more hash values.

17. The wireless device of claim 1, wherein to verify the configuration data, the one or more instructions, when executed by the processor, further cause the wireless device to:

determine whether a certificate associated with the configuration data is valid, and determine that the configuration data is valid when the certificate is determined to be valid.

18. The wireless device of claim 1, wherein the configuration data is encrypted.

19. The wireless device of claim 1, wherein the one or more instructions, when executed by the processor, further cause the wireless device to:

negotiate one or more privileges with the external interrogator device.

20. The wireless device of claim 1, wherein the configuration data is retrieved from the memory structure in response to a successful authentication process with the external interrogator device.

* * * * *